(12) United States Patent
Knight et al.

(10) Patent No.: US 7,100,300 B2
(45) Date of Patent: Sep. 5, 2006

(54) TAPE MEASURES WITH IMPACT PROTECTION

(75) Inventors: Jonathan Arnold Manley Knight, London (GB); Barry Howard Lee, Rayleigh (GB)

(73) Assignee: Fisco Tools Limited, Essex (GB)

( * ) Notice: Subject to any disclaimer, the term of this patent is extended or adjusted under 35 U.S.C. 154(b) by 0 days.

(21) Appl. No.: 10/522,685

(22) PCT Filed: Aug. 1, 2002

(86) PCT No.: PCT/GB02/03557

§ 371 (c)(1),
(2), (4) Date: Jan. 31, 2005

(87) PCT Pub. No.: WO2004/013570

PCT Pub. Date: Feb. 12, 2004

(65) Prior Publication Data

US 2005/0235515 A1 Oct. 27, 2005

(51) Int. Cl.
*G01B 3/10* (2006.01)
(52) U.S. Cl. .......................................... 33/767; 33/755
(58) Field of Classification Search ................. 33/755, 33/760, 767, 768, 769
See application file for complete search history.

(56) References Cited

U.S. PATENT DOCUMENTS

| | | | |
|---|---|---|---|
| 1,465,067 A | 8/1923 | Twamley | |
| 3,114,515 A | 12/1963 | Kane et al. | |
| 3,415,461 A | 12/1968 | Zelnick et al. | |
| 3,437,281 A | 4/1969 | Quenot et al. | |
| 3,443,316 A | 5/1969 | Edgell et al. | |
| 4,286,387 A * | 9/1981 | Di Diego | 33/769 |
| 4,443,944 A | 4/1984 | Beesley et al. | |
| 4,856,726 A * | 8/1989 | Kang | 33/767 |
| 5,137,248 A | 8/1992 | Sato et al. | |
| 5,791,581 A * | 8/1998 | Loeffler et al. | 33/767 |
| 6,182,916 B1 | 2/2001 | Lin | |
| 6,470,590 B1 * | 10/2002 | Lee | 33/767 |
| 6,854,197 B1 * | 2/2005 | Knight | 33/767 |
| 2002/0004993 A1 * | 1/2002 | Usami | 33/767 |
| 2002/0059735 A1 * | 5/2002 | Ponce | 33/760 |
| 2004/0163272 A1 * | 8/2004 | Knight | 33/767 |
| 2005/0028397 A1 * | 2/2005 | Blackman et al. | 33/769 |

* cited by examiner

*Primary Examiner*—G. Bradley Bennett
(74) *Attorney, Agent, or Firm*—Buchanan Ingersoll PC

(57) ABSTRACT

A tape measure is disclosed which has a spooled measuring blade mounted via a rotatable connection within a casing (100). The tape measure has impact-protection components. These components may be resilient means (46, 60, 62, 82, 108) arranged between the spooled blade and the case, such as at the rotatable connection. Further impact-protection components are resilient pads (112, 114) which are molded into impact-vulnerable locations on the outer surface of the case.

20 Claims, 8 Drawing Sheets

TAPE MEASURES WITH IMPACT PROTECTION

FIELD OF THE INVENTION

The present invention relates to tape measures, and in particular to tape measures having a spooled measuring blade.

BACKGROUND OF THE INVENTION

Known tape measures include tape measures having a measuring blade which is spooled within a casing. The blade is extendable from the casing by pulling its free end. When released, the blade is automatically retracted back into the casing. Typically, this retraction is due to a spring within the casing, for example a spring connected between the casing and a reel on which the blade spools.

For ease of manufacture, the casing is typically made from moulded plastics material. This allows the casing to be relatively lightweight and easy to handle. The moulding operation also allows the incorporation of detailed functional shapes into the casing in a single forming step.

Usually, the blade of the measure is metallic. For many applications, the blade must be strong and inextensible. Furthermore, it should also be stiff. This is particularly the case where the blade should be able to extend from the blade and hold itself in an approximately straight configuration without support at its distal end (the end furthest from the casing). Often, this desirable feature is achieved using a relatively thin blade which, when pulled longitudinally straight from the casing, has a transversely curved character. It is this transverse curvature which acts to maintain the blade in an approximately straight longitudinal configuration.

Typically, other materials (e.g. most plastics materials) do not give the blade the above advantageous features. In particular, most plastics materials are not stiff enough to enable the blade to remain approximately straight when extended from the casing and yet flexible enough to allow the blade to be spooled easily within the casing and tough enough to withstand repeated use.

However, one disadvantage of metallic blades is their weight. Most suitable metallic materials for the blade are more dense than equivalent plastics materials which might be considered for the application. For this reason, the blade is usually by far the heaviest (i.e. most massive) part of the tape measure.

Associated with the blade is the spring which acts to recoil the blade back into the casing after the blade has been extended from the casing. Again, the spring is usually made from metal and so is dense and therefore heavy.

The blade is usually spooled, within the casing, on a spool or other rotatable mounting. The blade is therefore rotatably mounted within the casing, for example a reel or spool may be rotatably mounted on a post within the casing in order to define an axis of rotation for the reel or spool. Typically, the spring is attached between the post and the blade, so that when the blade is unspooled, the spring is tightened to provide a return force on the blade.

Tape measures are often subjected to rough handling. In particular, in building, maintenance or DIY applications, tape measures are often dropped, e.g. from ladders. Drops onto relatively hard surfaces can be catastrophic for the tape measure. This is usually due to a combination of the plastics casing and the heavy blade. Since most of the mass of the whole tape measure is concentrated in the blade, during an impact on the casing, the blade is likely to move relative to the casing. Often, the result of this is damage to the case. More specifically, the post on which the blade is rotatably mounted usually either breaks or breaks away from the casing. This renders the tape measure inoperative or seriously impaired.

SUMMARY OF THE INVENTION

Accordingly, in a first aspect, the present invention provides: a tape measure having a spooled measuring blade mounted via mounting means within a case, the spooled measuring blade being rotatable with respect to the case about a rotation axis; and resilient means interposed in the mounting means between the spooled blade and the case, wherein the resilient means permits but urges against displacement of the spooled blade with respect to the case.

The resilient means can provide impact shock protection to the tape measure by, to some extent, mechanically insulating the mass of the blade from the casing. The resilient means preferably does not adversely affect the rotation of the spooled blade, i.e. it preferably does not affect the way in which the blade is extended from the casing for use. In this sense, "displacement" means linear (as opposed to rotational) movement of the whole spooled blade. The whole blade can be considered to have two parts at any particular time: the part which is spooled within the casing (the spooled blade) and the part (if any) which is extended from the casing (the extended blade). In the present case, it is the spooled blade which is of concern, since it is the inertia of this part which can lead to damage of the tape measure.

The resilient means can be placed in two distinct locations.

Firstly, the spooled blade may be rotatable with respect to the resilient means. In that case, the resilient means may be fixed with respect to the casing. The resilient means may be located between the casing and an axle element, for example. The axle element may be a mounting element on which the spooled blade is rotatable. For example, it may be a post, pin, lug or plurality of lugs about which the spooled blade (or, more usually, the means on which the blade is spooled) is rotatable. Typically, the axle element does not rotate with respect to the casing. It is the axle element which is usually prone to breakage during an impact, so the resilient means acts to cushion the shock transferred to the axle element by the combination of the impact on the casing and the inertia of the spooled blade.

In this first case, the resilient member may be a bush or cup holding one end of the axle element with respect to a casing wall. There may be a corresponding resilient member located at the other end of the axle element with respect to an opposing casing wall.

Conveniently, the resilient member may be formed by injection moulding of, e.g. rubber. The injection moulding of this or similar resilient material may be performed within the same tool as the injection moulding of the material for the casing. In particular, the resilient member may be formed in one piece with another resilient part attached to the casing, such as an external pad formed on the outer surface of the casing. This is discussed in more detail below with respect to a method of forming the tape measure.

In this first case, the resilient member can be the axle element itself, or part of the axle element. This eliminates the need for a separate axle element about which the spooled blade is to be rotatable. Typically, the axle element must be relatively stiff to provide a firm rotatable mounting position for the spooled blade. It should also be resilient and/or tough enough to withstand impact on the casing. In this case, the mounting means for the spooled blade is the means by which the axle element is attached to the casing, e.g. by a complementary shape in the casing allowing a friction fit.

Secondly, the resilient means may be rotatable with the spooled blade with respect to the casing. In that case, when the casing has an axle element (or axle elements) about which the spooled blade is rotatable, the resilient means is also rotatable with respect to the axle element.

In this second case, the mounting means preferably includes a spooling device. This may be a rotatable frame on which or within which the blade can be spooled. In some embodiments, the spooling device may be a reel or a drum. In other embodiments, the spooling device may include side members which act to guide the blade during spooling and unspooling. The side members rotate with the spooled blade and can act to prevent the blade from abrading or touching the inner surface of the casing. The side members need not be connected to each other. The may each rotate about the axle element or elements. This construction is advantageous since the absence of a connection between the side members allows the spring to be attached easily between the blade and an anchor point fixed with respect to the casing (e.g. the axle element or post). This construction may also allow the spring more freedom of movement, i.e. allow fuller coiling and partial uncoiling of the spring.

The spooled blade is typically located on an outer portion of the spooling device. The spring is typically located at an inner porting of the spooling device. Since the greater proportion the mass of the tape measure is due to the blade, the spooled blade on the spooling device has significant inertia which must be managed during an impact on the casing.

Therefore, the resilient member may be formed in the spooling device. Preferably, it is located between the outer portion of the spooling device and the axle element.

In the case where the spooling device includes side members, e.g. disc-shaped side members, the resilient means may be formed at the inner portion of one or both of the side members. Each disc typically has a bearing surface for bearing on the axle element(s) for rotation of the side member and hence rotation of the spooled blade. To be particularly effective, the resilient member should be located between the bearing surface and the outer portion of the spooling device or disc.

The resilient member may be of a resilient material such as rubber.

Additionally or alternatively, the resilient member may owe its resilience more to its structure than to its material.

Preferably, the resilient member is a connecting element which connects the outer portion of the spooling device to the bearing surface of the spooling device. The connecting element is typically shaped so that at least a part has a transverse component of force acting to bend it under a force acting radially between the bearing surface and the outer portion. "Radial" implies that the spooling device has circular symmetry, which is often true. In this case, a radial force is usually one which acts in a plane containing the outer portion of the spooling device and the bearing surface and which is substantially directed to intersect the axis of rotation of the spooling device. Preferably the resilient member is a series of connecting elements disposed around the bearing surface.

For example, the resilient member may be a spoke or a series of spokes arranged between the outer portion and the bearing surface of the disc or spooling device. Alternatively, the resilient member may be a strut, series of struts or a network of struts arranged between the outer portion and the bearing surface of the disc or spooling device. The resilience then comes from deformation (e.g. bending) of the spokes or struts.

To operate well, the resilient member should allow the bearing surface of the spooling device to move relative to the outer portion of the spooling device, but urge against such movement. Particularly preferred embodiments use non-linear struts or spokes, e.g. curved struts or spokes which can deform more easily than straight struts or spokes. In particular, the struts or spokes should not extend in a straight line the whole distance from the bearing surface to the outer portion of the spooling device. Therefore, any straight-line force acting between the bearing surface and the outer portion of the spooling device should act to bend at least a part of the spokes or struts (e.g. that part which does not coincide with the straight-line force). Put another way, the connection path from the outer portion to the bearing surface via the spokes or struts is preferably non-linear.

The shape of the spokes or struts can be selected according to the resilience required from the arrangement. The spokes or struts can form a spiral shape from the outer portion towards the bearing surface. They can be of S-shape, Z-shape, W-shape, V-shape, U-shape, C-shape, L-shape, dog-leg shape, concertina-shape, or combinations thereof. In particular, the resilient means may include a combination of spokes and struts arranged so that a path from the outer portion of the spooling device form a dog-leg along at least one spoke and at least one strut. Preferably, this arrangement is repeated for the whole resilient means. In this sense, a "spoke" can be a connection element which is arranged generally radially (but not necessarily in a straight line) from the outer portion of the spooling device towards the bearing surface. A "strut" can be a connection element which is arranged generally circumferentially (but not necessarily along the arc of a circle or in a straight line) between the outer portion of the spooling device and the bearing surface.

The gaps between adjacent spokes/struts may be filled with a resilient or shock-absorbing material, e.g. rubber. This can be used to tune the spring-back properties of the spooling device.

Since it is the axle element which is most likely to fail during an impact which displaces the spooled blade with respect to the casing, the inventors have investigated further this problem.

In a second, independent, aspect of the invention, there is provided: a tape measure having a spooled measuring blade mounted via a spooling device within a case, the spooled measuring blade and the spooling device being rotatable with respect to the case about a rotation axis; and stop means located to abut against cooperating means on the spooling device on displacement of the spooling device with respect to the case.

Typically, the stop means is located to abut against an outer surface of the spooling device.

Typically, the spooling device is rotatably mounted within the casing via one or more axle elements, as described with respect to the first aspect.

The stop means is preferably located so that the displacement of the spooling device (and hence substantially the displacement of the spooled blade) with respect to the casing is stopped or urged against at a displacement less than that required to cause failure or damage to the axle element.

The stop means may be a step, protrusion or recess formed in the inner surface of a side wall of the casing. The step or protrusion may extend substantially all the way (e.g. circumferentially) around the casing. A corresponding step, protrusion or recess may be formed on the inner surface of an opposing side wall of the casing, this corresponding stop means being provided to abut against another, corresponding part of the spooling device.

Preferably, the stop member is an annular stop ring connected to the casing and extending adjacent to the spooling device.

Alternatively, the stop member is an annular stop ring connected to the casing and extending around an outer abutment surface of the spooling device.

In the case where the stop member and the spooling device contact each other during non-impact (i.e. normal) use, the contact is preferably low-friction. This can be assisted by making the contacting surfaces of dissimilar materials.

The stop member may be of a resilient material. This helps shock-absorption and can avoid damage to the spooling device and/or the casing. Alternatively, the stop member may be formed of a relatively non-resilient material, e.g. it may be formed of the same material as the casing (typically relatively hard-wearing plastics material).

The second aspect may be combined with the first aspect and/or any optional feature described with respect to that first aspect. In particular, the spooling device of the first aspect and/or the resilient means of the first aspect may be used in this second aspect to advantageous effect.

The first and second aspects of the invention deal mainly with the reduction or prevention of damage to the inner components of the tape measure, in particular the spooling device and the rotational assembly (e.g. axle element). The inventors have also investigated the damage which an impact can impart to the casing of a tape measure. As mentioned above, the casings of modern tape measures are usually made from plastics materials due to the ease of formation of the complex shapes required for the casing by, e.g. injection moulding techniques. The casing must be relatively stiff to retain its overall shape and to avoid interference with the blade. A consequence of this is that the casing is often quite brittle and prone to breakage during impact.

There are known tape measures which have overjackets formed of resilient material. That is, a jacket is formed around the tape measure after the tape measure has been assembled, or the tape measure is inserted into a jacket after assembly of the tape measure. The jackets are typically provided for the purpose of improving the grip provided to a user. If made from resilient material, they have a further effect which is a shock-protection effect.

The overjackets provided by these known tape measures are bulky. In particular, since they are fitted to the tape measure, they must have lateral walls to grip the tape measure. These lateral walls make the whole object relatively thick and bulky to handle.

In a general aspect, the present invention addresses the shock protection of the casing by providing resilient means, e.g. pads, at selected impact-vulnerable locations in the casing. This is a third, independent, aspect of the invention.

Preferably, the third aspect of the invention provides: a tape measure having a spooled measuring blade mounted within a case, and resilient means selectively located at the outer surface of the case, the location or locations of the resilient means being selected according to the vulnerability to impact of the location or locations.

The selective location of a (but preferably more than one) resilient pad or means allows the casing to be protected from impact at a vulnerable place, but allows the whole tape measure to retain the overall outward shape of the casing, and can reduce the overall thickness of the tape measure with respect to a corresponding tape measure held in an overjacket.

Particularly vulnerable locations on the outer surface of the casing are the tape mouth (the opening in the casing from which the measuring blade is drawable), the switch (typically for engaging and disengaging a brake for controlling the blade) and the corners of the case.

The resilient means may be formed by moulding-in resilient material into corresponding recesses formed in the casing. In the case of resilient pads, these may be anchored into the casing by suitable shaping of the recesses.

In another aspect, the present invention provides a method of forming a tape measure having a casing enclosing a spooled measuring blade, the method including the steps of: moulding a casing section by injection moulding of a first material in a mould tool; and injection moulding a second, resilient material into at least one predetermined location in the mould tool so that the resilient material is moulded into a selected location of the casing section.

Moulding-in of resilient pads in this way allows intimate connection of the resilient pads to the casing. This makes the pads secure and removes the need for an overjacket to provide shock protection.

As has already been mentioned, this method is advantageously applied in order to provide the resilient means according to the first aspect. In particular, in the case where the resilient means does not rotate with respect to the casing, it can be formed by moulding-in during casing formation. For example, the resilient means may be formed as one piece with a resilient moulding (e.g. a pad) formed on the outer surface of the case. In that case, an interconnection between the pad and the resilient means is provided through the casing. The pad may be provided as a label-carrying surface of the casing.

Preferably, the method aspect (and/or any preferred feature thereof) can be combined with any of the first, second and third aspects, and/or any preferred feature thereof.

Preferably, the invention provides a tape measure which can withstand an impact without significantly affecting its performance, e.g. without cracking or denting the casing and/or without cracking or permanently deforming the spooling device or the axle element(s). Most preferably, a tape measure according to the invention can withstand a drop of 3, 5 or even 10 meters onto a hard surface such as concrete.

BRIEF DESCRIPTION OF THE DRAWING FIGURES

Preferred embodiments of the present invention will now be described, by way of example only, with reference to the accompanying drawings, in which.

DETAILED DESCRIPTION

Figure 1:
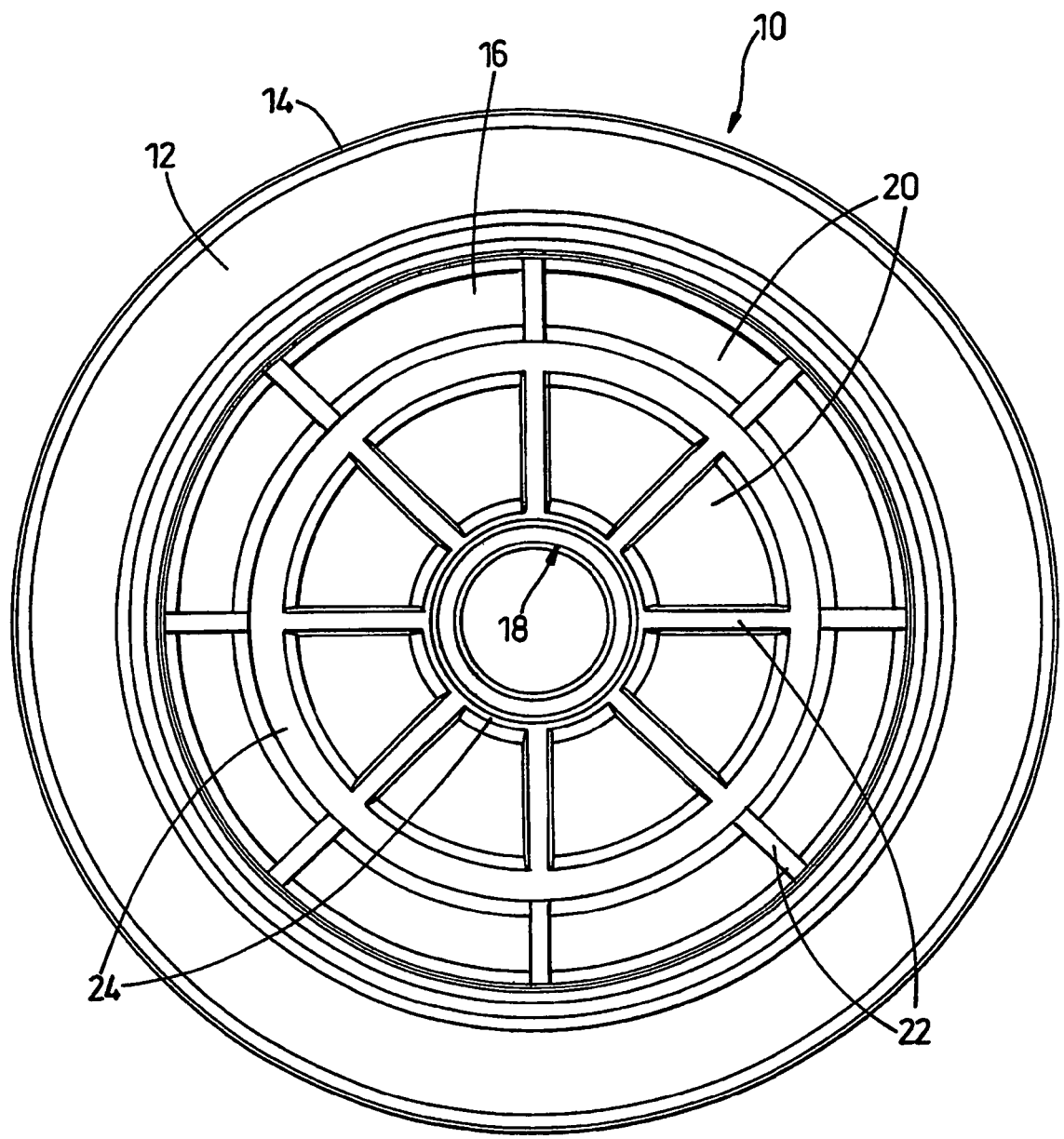
FIG. 1 is a schematic plan view of a known spooling disc.

FIG. 1 shows a known spooling disc 10. The disc has an outer portion 12 with an outer surface 14. In a typical spooling device, the measuring blade of a tape measure (not shown) is held between two opposing spooling discs 10 (only one is shown in FIG. 1). The tape measure is supported on a step (not shown) on each spooling disc, the step defining the interface between the outer portion of the disc and the inner portion 16 of the disc. In FIG. 1, the step is on the opposite face to the face illustrated. The inner portion 16 terminates towards the centre of the disc at a bearing surface 18. In use, bearing surface 18 rotates with respect to an axle (not shown) in the tape measure (not shown).

The construction of inner portion 16 is of thin-walled parts 20 and reinforcing spokes 22 and reinforcing rings 24. This construction is aimed at giving a strong and stiff inner portion with little or no excess material used, for economy of material and weight. Typically, the spring is located between the inner portions of adjacent spooling discs.

Figure 2:
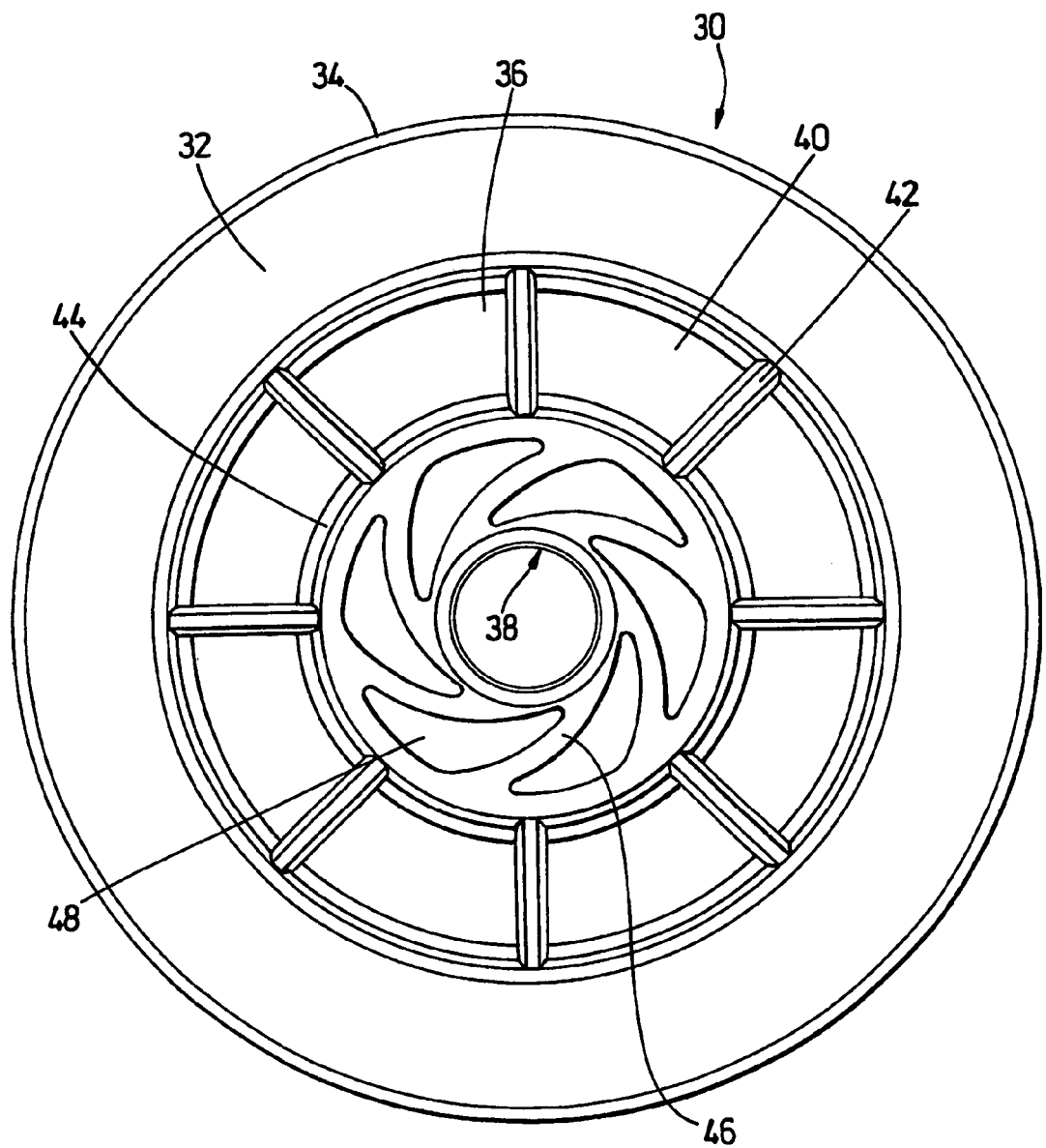
FIG. 2 is a schematic plan view of a spooling disc of a tape measure according to an embodiment of the invention.

FIG. 2 shows a spooling disc 30 according to an embodiment of the invention. Disc 30 has an outer portion 32 with an outer surface 34 and an inner portion 36. The central part of the inner portion 36 terminates in a bearing surface 38 for rotatably moving against an axle (not shown) of a tape measure (not shown).

The inner portion 36 has spokes 42 extending in straight, radial lines towards the centre of the disc. Between the spokes 42 are thin walls 40. The spokes 42 extend from the outer portion 32 and terminate at reinforcing ring 44. Between the reinforcing ring 44 and bearing surface 38 are curved spokes 46. In this embodiment, curved spokes 46 together form a spiral pattern centred on the centre of the disc 30. Between the curved spokes 46 are gaps 48 which are empty. However, in other embodiments, these gaps may be filled with resilient material such as rubber, in order to tune the resilience of the inner portion of the disc as a whole.

Together, the curved spokes form a resilient means between the bearing surface and the outer portion of the disc. Therefore, the outer portion can move, to some extent, with respect to the bearing surface. Since the outer portion bears the weight (and inertia) of the spooled blade, this movement can distribute the effect of an impact to the tape measure over time. This can have the effect of damping the movement of the bearing surface with respect to the case, and therefore avoiding damage to the axle of the tape measure.

During a radial impact (radial with respect to the disc), a curved spoke flexes since the force of the impact has at least a component which is transverse to the direction of the curved spoke. It is this flexing which allows the outer portion 32 of the disc to move with respect to the bearing surface 38.

The inner portion design shown in FIG. 2 is relatively stiff, since for each spoke which bends, other spokes must also deform in order to allow the outer portion 32 to move with respect to the bearing surface 38. In particular, those spokes which are roughly parallel to the direction of the force are urged to compress or extend by the force. Since the spokes are quite resistant to compression or extension, these spokes tend to make the disc relatively stiff.

Figure 3:
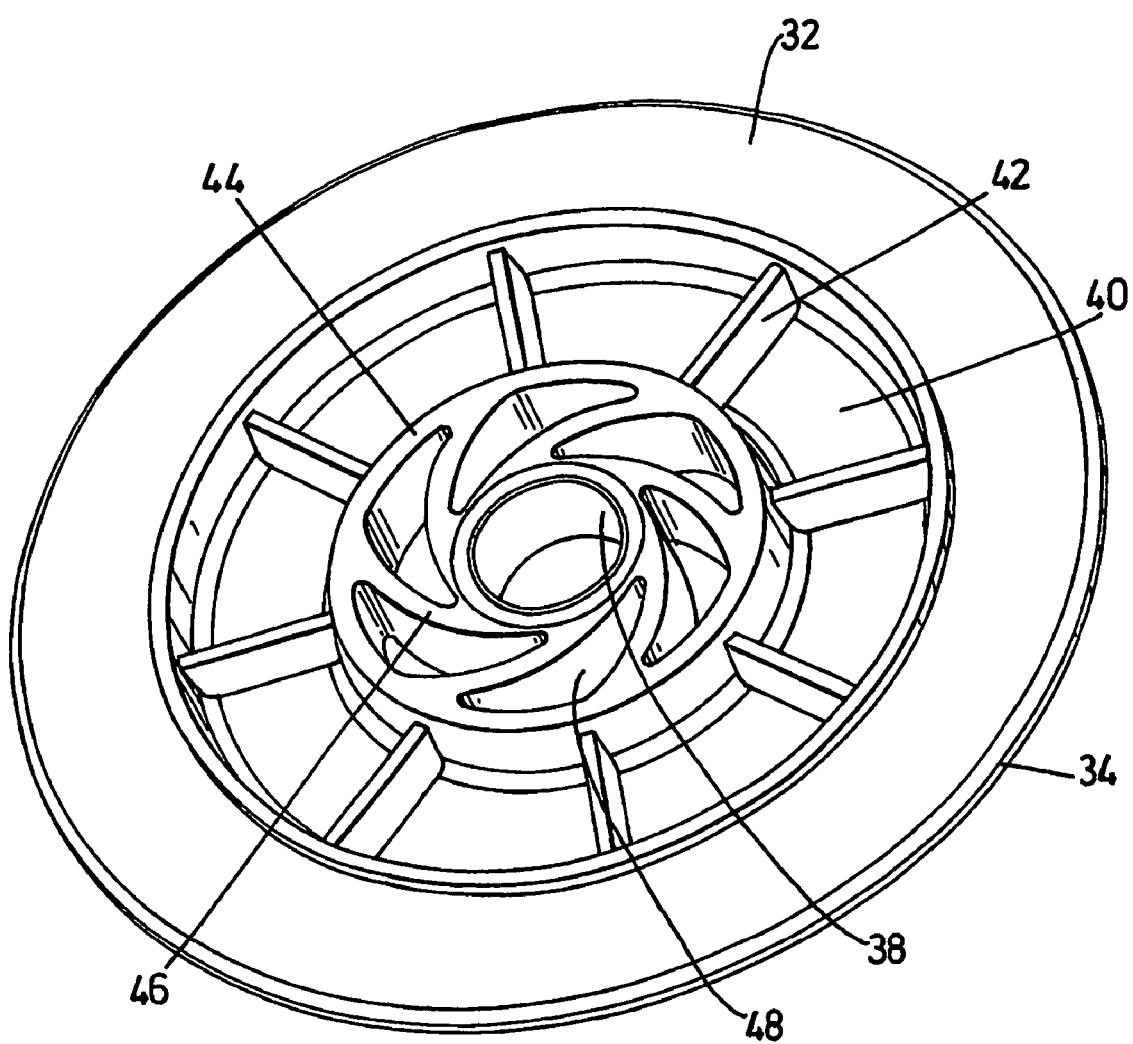
FIG. 3 is a schematic perspective view of the spooling disc of FIG. 2.

The disc of FIG. 2 is shown in perspective in FIG. 3. Like features are labelled with like reference numbers.

Figure 4:
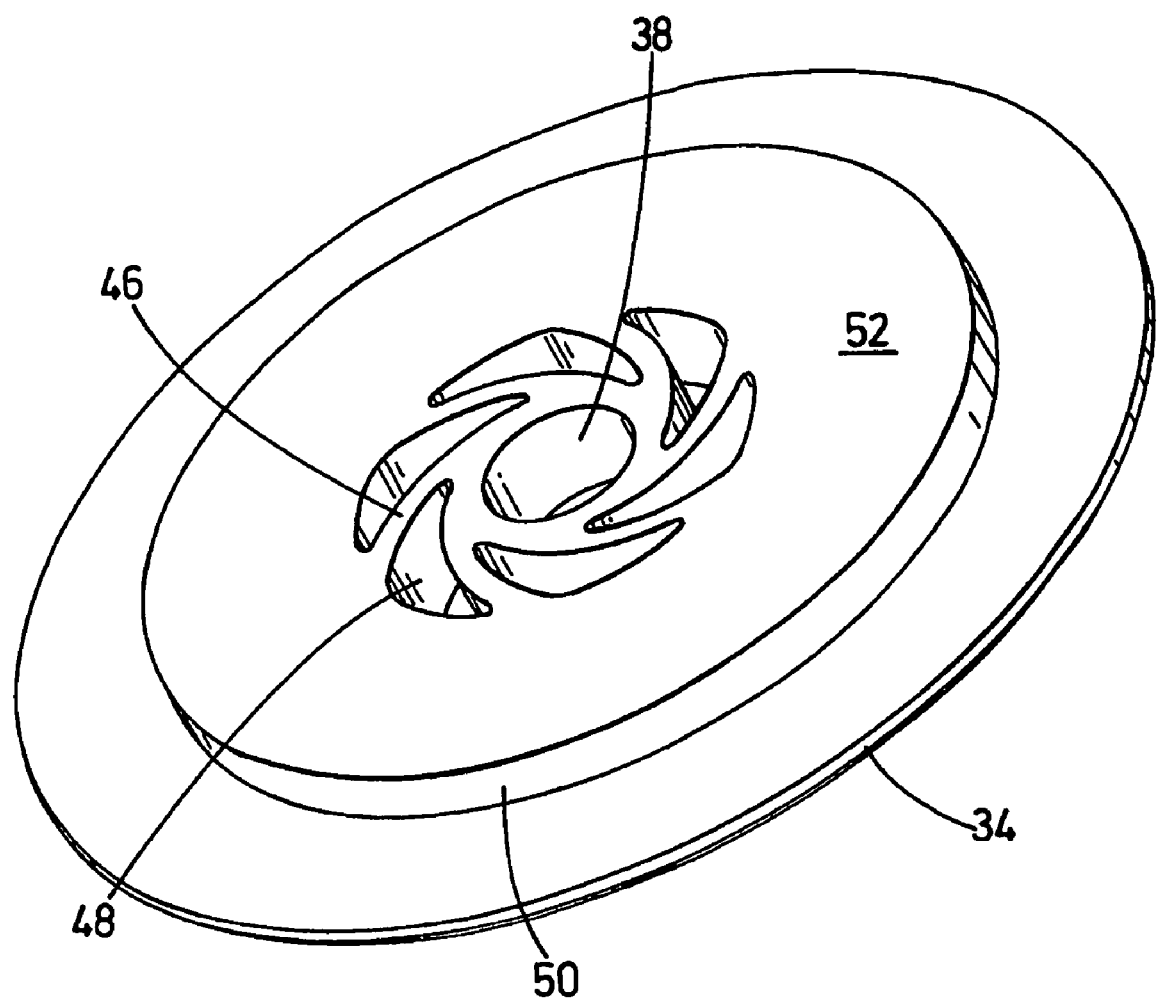
FIG. 4 is an alternate schematic perspective view of the spooling disc of FIG. 2

The disc of FIG. 2 is also shown in perspective in FIG. 4. FIG. 4 shows the opposing side of the disc to that shown in FIG. 3. Again, like features are given like reference numerals to those given in FIGS. 2 and 3. FIG. 4 shows that the gaps 40 between adjacent spokes in FIGS. 2 and 3 are filled by thin walls. The surface 52 shown in FIG. 4 faces the spring in the spooling device. Therefore, the spring (not shown) is located between opposing surfaces 52 of opposing discs.

Also shown in FIG. 4 is step 50 which defines the interface between the inner and outer portions of the disc. In use, the spooled blade is supported by this step, between opposing discs in the spooling device.

Figure 5:
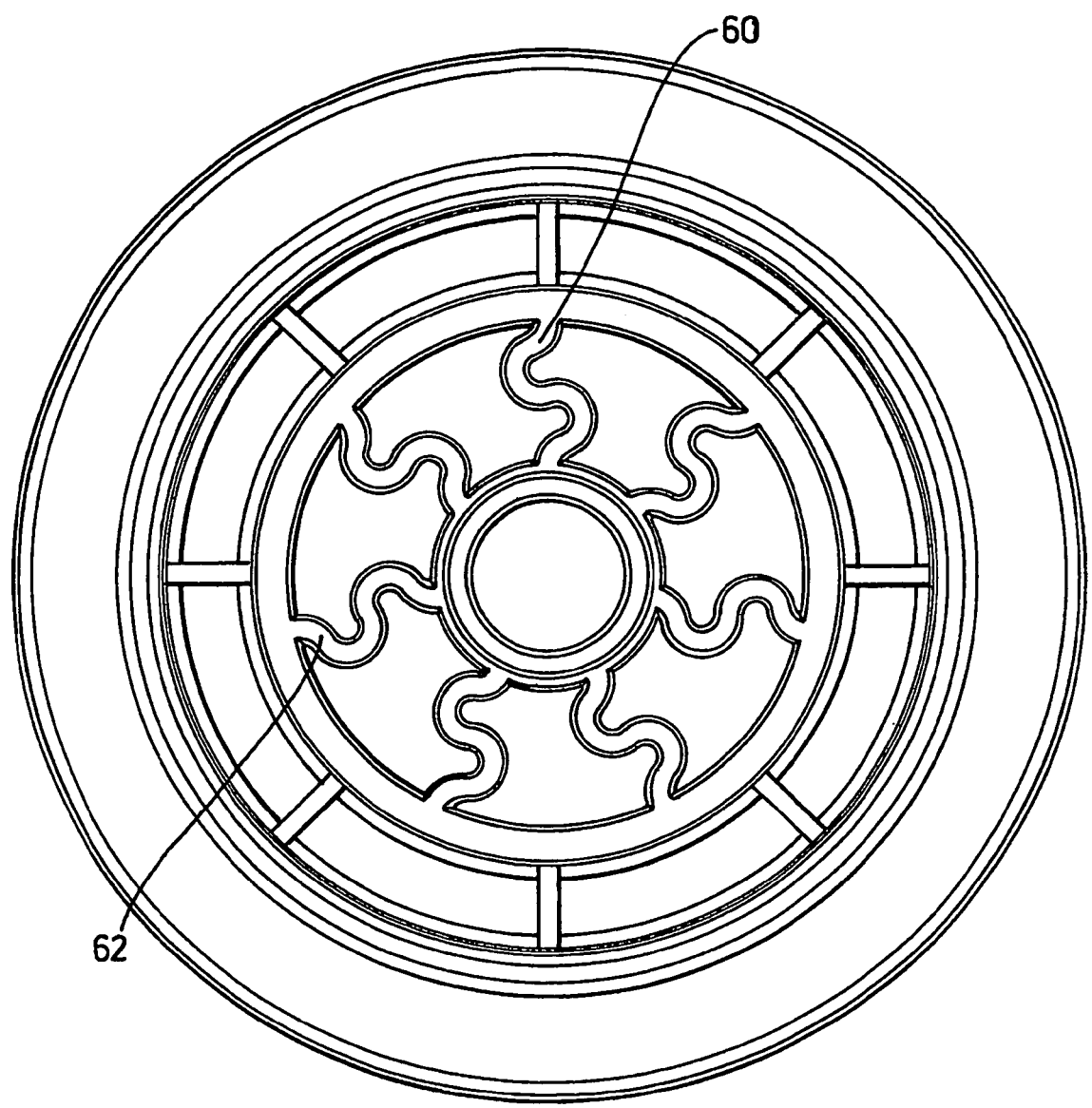
FIG. 5 is a schematic plan view of a spooling disc of a tape measure according to another embodiment of the invention.

FIG. 5 shows another embodiment of a disc for a spooling device. Features similar to the embodiment shown in FIGS. 2 to 4 will not be described again. In FIG. 5, the spokes 60, 62 are S-shaped. In this embodiment, the spokes can be considered to be individual spring elements. Each is able to extend, compress or flex. Therefore, if a radial (with respect to the disc) force acts to compress spoke 60, that same force acts to shear spoke 62. The S-shape of spokes 60 and 62 allow the spokes to accommodate either type of deformation. Therefore, the presence of spoke 62 will not severely impair the ability of spoke 60 to compress or extend, and vice versa. This construction of the inner portion generally makes the disc more resilient (i.e. less stiff) than the disc shown in FIGS. 2 to 4.

Figure 6:
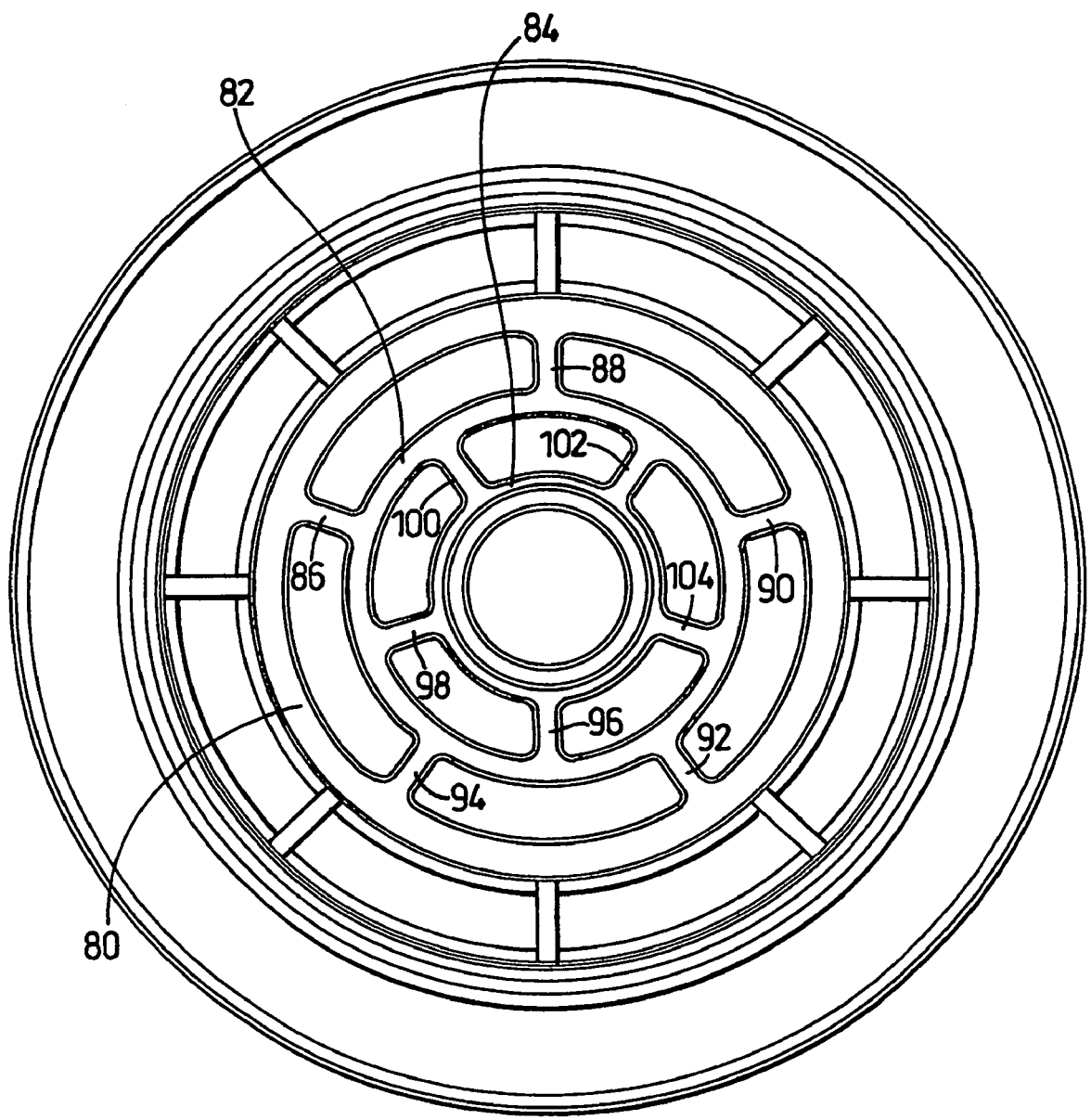
FIG. 6 is a schematic plan view of a spooling disc of a tape measure according to another embodiment of the invention.

FIG. 6 shows another embodiment of a disc for a spooling device. Again, features similar to the embodiment shown in FIGS. 2 to 4 will not be described again. In FIG. 6, a series of concentric ring members 80,82,84 is formed in the inner portion of the disc. Between the first ring 80 and the second ring 82 are formed straight spokes 86,88,90,92,94. Between the second ring and the third ring are formed straight spokes 96,98,100,102,104. None of the spokes 96–104 are co-linear with any of spokes 86–94. That is, in drawing a line of connection between the first ring 80 and the third ring 84, the line is not straight. In the present case, such lines of connection are all dog-legs, involving some travel along the second ring 82. During an impact which produces a radial force, e.g. along the line of spoke 88, the force bends the second ring in the region between its connection between spokes 100 and 102. It is this bending which allows the inner portion of the disc to absorb resiliently the impact. Considering the effect of the same radial force on the spoke 90, the movement of the third ring 84 relative to the outer portion of the disc is accommodated by bending of the spokes 90,104 and, to some extent, 102.

A similar (and slightly less stiff) configuration can be made using interconnecting struts between spokes 86–94 and spokes 96–104. The interconnecting struts replace the second ring 82, and the shape change of the ring can be accommodated by bending of the struts in the same way as the bending of the second ring 82 accommodates the shape change in FIG. 6.

Figure 7:
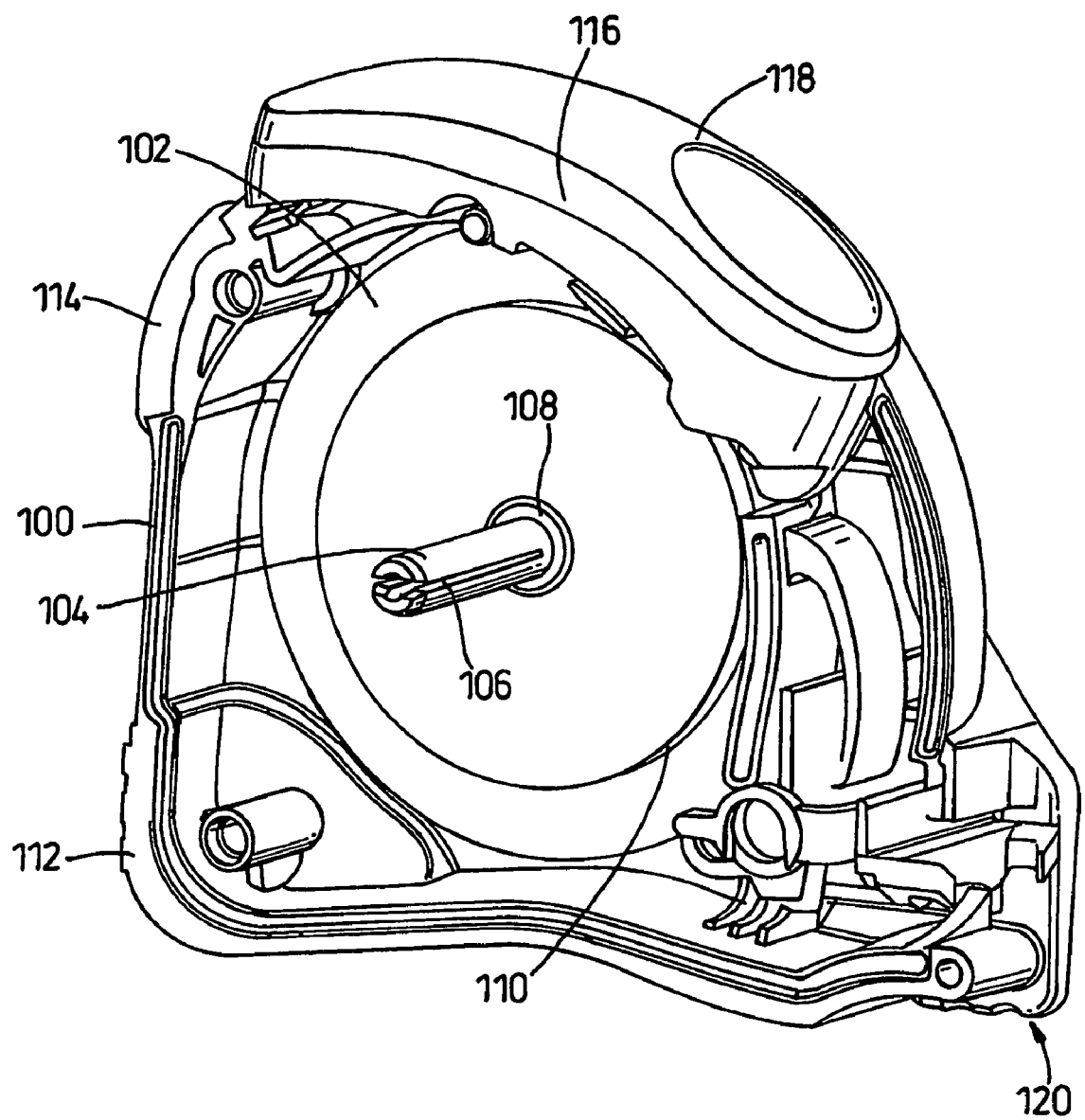
FIG. 7 is a schematic partial sectional view (in perspective) of one half of a tape measure according to an embodiment of the invention.

FIG. 7 shows another embodiment of the invention. In FIG. 7, one half of a tape measure is shown. The measuring blade is not shown. The case 100 is formed from injection moulded plastics material. One disc 102 of a spooling device is mounted within the case 100 on a centre post 104. The centre post acts as an axle about which the spooling disc 102 (and the remainder of the spooling device which is not shown) is rotatable. The centre post has a split configuration with a mouth 106 for receiving one end of a spring of the spooling device.

The centre post 104 has a resilient (e.g. rubber) bush 108 interposed between itself and the disc 102. The bush 108 allows the disc 102 to move with respect to the centre post 104. During an impact on the case, the disc 102 (which carries the spooled blade on step 110) is subjected to the inertia of the spooled blade. Movement of the disc without damage to the blade is accommodated by deformation of the resilient bush 108. The bush 108 may be formed by mounding-in of rubber material during moulding of the casing.

The case 100 has, at its outer surface, resilient pads 112,114 which are moulded into vulnerable locations in the case. Furthermore, the rocker switch 116 of the tape measure case has at least one moulded in resilient pad 118 on its outer surface. These pads 112,114,116 provide shock absorption to the tape measure during an impact. Other parts of the tape measure may be protected by similar resilient mould-ins, e.g. the tape mouth area 120.

Figure 8:
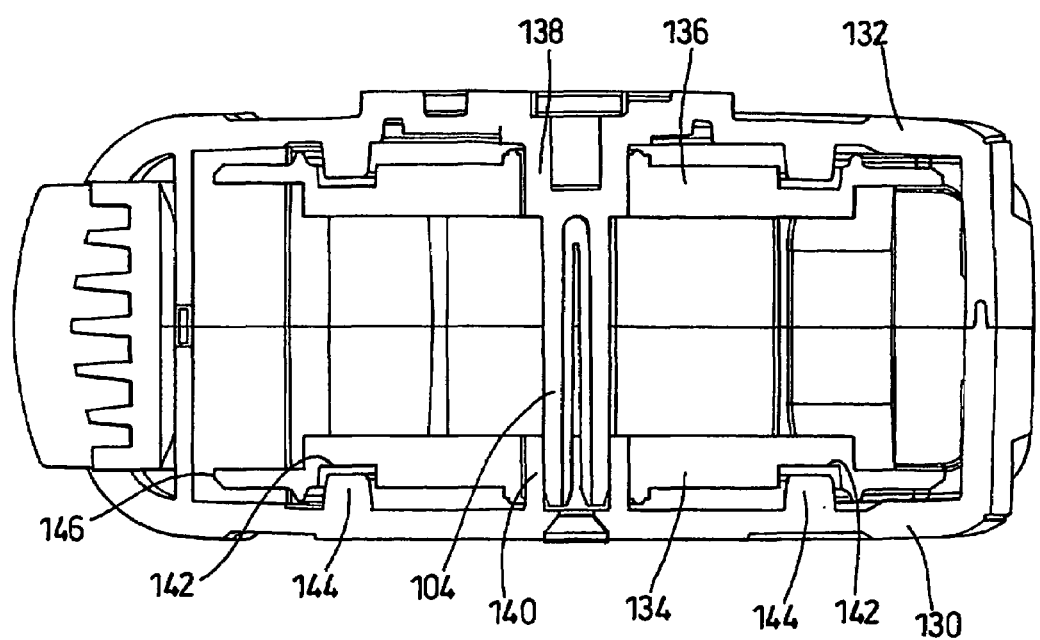
FIG. 8 is a schematic sectional view of a tape measure according to another embodiment of the invention.

FIG. 8 shows another embodiment of the invention. In FIG. 8, a cross-section of a tape measure is illustrated, taken though the centre of the tape measure and showing the centre post 104 and side walls 130 and 132. FIG. 8 does not show the spring or the spooled blade. However, it does show two opposed spooling discs 134,136. Spooling disc 136 is rotatably mounted on the root 138 of the centre post 104. Centre post 104 and root 138 are formed in one piece with side wall 132. Centre post 104 is received by locating collar 140 which is formed in one piece with side wall 130. Spooling disc 134 is rotatably mounted on locating collar 140.

In this embodiment, neither the centre post 104 nor the spooling discs 134,136 have resilient means for shock absorbance. Of course, such means could be added to the embodiment, in accordance with the embodiments described above.

Spooling disc 134 had an annular groove 142 formed in its outer surface (i.e. the surface facing away from the opposing spooling disc). Annular groove 142 cooperates with annular retaining ring 144 which projects inwardly from the inner surface of the side wall 130. In use, i.e. on rotation of spooling disc 134, annular groove 144 moves along the annular retaining ring 144. Displacement of the spooling disc 134 in relation to the collar 140 is prevented by the retaining ring 144, i.e. by abutment of the surface of the groove 142 with the surface of the retaining ring 144. Since the force urging the spooling ring to move (due to the inertia of the spooled blade during an impact) is spread over a relatively large area on the retaining ring 144, the pressure on the retaining ring is lower than the pressure would be on the collar 140 if the retaining ring were not present. Therefore, for a given impact, the tape measure is less likely to suffer damage to the centre post 104 or the collar 140.

Spooling disc 136 has a similar arrangement.

The retaining ring could also be located at a greater radius from the axis of rotation of the spooling disc 134, e.g. instead of the retaining ring cooperating with an annular groove in the disc, it could cooperate with the end surface 146 of the disc.

The retaining ring can be formed of a resilient material, allowing it to absorb shock from the impact. This resilient ring can be formed by moulding-in, as described above.

The embodiments described above are described by way of example only. Modifications of those embodiments, further embodiments and modifications thereof will be apparent to the skilled person, and as such are within the scope of the invention.

The invention claimed is:

1. A tape measure having:

a spooled measuring blade mounted via mounting means within a casing, the spooled measuring blade being rotatable with respect to the case about a rotation axis; and resilient means interposed in the mounting means between the spooled blade and the case, wherein the resilient means permits but urges against displacement of the spooled blade with respect to the case in a direction radial to the rotation axis.

2. A tape measure according to claim 1 wherein the spooled blade is rotatable with respect to the resilient means.

3. A tape measure according to claim 2 wherein the resilient means is interposed between the casing and an axle element which is fixed with respect to casing.

4. A tape measure according to claim 2 wherein the resilient member is a bush or cup.

5. A tape measure according to claim 1 wherein the mounting means includes a spooling device and the resilient means is rotatable with the spooling device with respect to the casing.

6. A tape measure according to claim 5 wherein the spooling device has a side member which acts to guide the blade during spooling and unspooling, the resilient member being formed in the side member.

7. A tape measure according to claim 5 wherein the spooled blade is located on an outer portion of the spooling device.

8. A tape measure according to claim 7 wherein the resilient member is formed in the spooling device and is located between the outer portion of the spooling device and a bearing surface of the spooling device.

9. A tape measure according to claim 8 wherein the resilient member is a connecting element which connects the outer portion of the spooling device to the bearing surface of the spooling device, the connecting element being shaped so that at least a part has a transverse component of force acting to bend it under a force acting radially between the bearing surface and the outer portion.

10. A tape measure according to claim 9 wherein the resilient member is a series of connecting elements disposed around the bearing surface.

11. A tape measure according to claim 10 wherein the connecting elements form a spiral shape from the outer portion towards the bearing surface or are selected from S-shape, Z-shape, W-shape, V-shape, U-shape, C-shape, L-shape, dog-leg shape, concertina-shape, or combinations thereof.

12. A tape measure according to claim 10 wherein gaps between adjacent spokes/struts are filled with a resilient or shock-absorbing material.

13. A tape measure according to claim 1 having a spooling device on which the blade is mounted; and stop means located to abut against cooperating means on the spooling device on displacement of the spooling device with respect to the case in a direction radial to the rotation axis, wherein the stop means is a step, protrusion or recess formed in the inner surface of a side wall of the casing which extends substantially all the way around the casing and the corresponding cooperating means on the spooling device is a step, recess or protrusion, respectively.

14. A tape measure according to claim 13 wherein the stop means is located so that displacement of the spooling device with respect to the casing is stopped or urged against at a displacement less that that required to cause failure or damage to an axle element about which the spooling device is rotatable.

15. A tape measure according to claim 13 wherein the stop member is an annular stop ring connected to or formed in the casing and extending adjacent to the spooling device.

16. A tape measure according to claim 1 having resilient means selectively located at the outer surface of the case, the location or locations of the resilient means being selected according to the vulnerability to impact of the location or locations the resilient means being formed by moulding-in resilient material into corresponding recesses formed in the casing.

17. A tape measure having a spooled measuring blade mounted via a spooling device within a case, the spooled measuring blade and the spooling device being rotatable with respect to the case about a rotation axis; and stop means located to abut against cooperating means on the spooling device on displacement of the spooling device with respect to the case in a direction radial to the rotation axis, wherein the stop means is a step, protrusion or recess formed in the inner surface of a side wall of the casing which extends substantially all the way around the casing and the corresponding cooperating means on the spooling device is a step, recess or protrusion, respectively.

18. A tape measure according to claim 17 wherein the stop means is located so that displacement of the spooling device with respect to the casing is stopped or urged against at a displacement less than that required to cause failure or damage to an axle element about which the spooling device is rotatable.

19. A tape measure according to claim 17 wherein the stop means comprise an annular stop ring connected to or formed in the casing and extending adjacent to the spooling device.

20. A tape measure according to claim 17 having resilient means selectively located at the outer surface of the case, the location or locations of the resilient means being selected according to the vulnerability to impact of the location or locations, the resilient means being formed by moulding-in resilient material into corresponding recesses formed in the casing.

* * * * *